United States Patent
Brent, Jr.

(10) Patent No.: US 9,480,275 B2
(45) Date of Patent: Nov. 1, 2016

(54) COATED PET FOOD PRODUCTS

(75) Inventor: John Leslie Brent, Jr., Springboro, OH (US)

(73) Assignee: MARS INCORPORATED, McLean, VA (US)

( * ) Notice: Subject to any disclaimer, the term of this patent is extended or adjusted under 35 U.S.C. 154(b) by 1765 days.

(21) Appl. No.: 11/433,293

(22) Filed: May 12, 2006

(65) Prior Publication Data

US 2006/0263416 A1     Nov. 23, 2006

Related U.S. Application Data

(60) Provisional application No. 60/682,901, filed on May 20, 2005.

(51) Int. Cl.
*A23K 1/165* (2006.01)
*A23K 1/00* (2006.01)

(52) U.S. Cl.
CPC ............... *A23K 1/005* (2013.01); *A23K 10/20* (2016.05); *A23K 40/30* (2016.05); *A23K 40/35* (2016.05); *A23K 50/40* (2016.05); *A23K 50/45* (2016.05); *A23K 50/48* (2016.05); *A23V 2002/00* (2013.01)

(58) Field of Classification Search
USPC ................... 426/89, 94, 106, 131, 521, 805
IPC ........... A23K 1/005,1/1846, 1/004, 1/10, 1/186, A23K 1/1866, 40/35, 40/30, 10/20, 50/40, A23K 50/45, 50/48; A23V 2002/00, 2200/22, A23V 2200/18, 2200/3204, 2300/16, 2200/3202, A23V 2200/318, 2200/32
See application file for complete search history.

(56) References Cited

U.S. PATENT DOCUMENTS

| | | | |
|---|---|---|---|
| 3,808,340 A | 4/1974 | Palmer | |
| 3,808,341 A | 4/1974 | Palmer | |
| 3,852,483 A | 12/1974 | Oborsh et al. | |
| 3,873,736 A | 3/1975 | Palmer et al. | |
| 3,898,345 A * | 8/1975 | Horrocks et al. | 426/274 |
| 3,965,268 A | 6/1976 | Stocker et al. | |
| 4,022,915 A | 5/1977 | Zukerman et al. | |
| 4,039,689 A * | 8/1977 | Bone | 426/99 |
| 4,315,034 A | 2/1982 | Levinson et al. | |
| 4,330,562 A | 5/1982 | Nassar et al. | |
| 4,410,551 A | 10/1983 | Comer et al. | |
| 4,508,741 A | 4/1985 | Corbett et al. | |
| 4,781,939 A * | 11/1988 | Martin et al. | 426/646 |
| 4,855,507 A | 8/1989 | Robertson et al. | |
| 5,527,549 A | 6/1996 | Bernacchi et al. | |
| 5,593,717 A | 1/1997 | Huber et al. | |
| 6,171,640 B1 | 1/2001 | Bringe | |
| 6,277,435 B1 | 8/2001 | Lacombe et al. | |
| 6,451,553 B1 | 9/2002 | Olsen | |
| 6,582,740 B1 * | 6/2003 | May et al. | 426/90 |
| 7,211,280 B1 | 5/2007 | Young et al. | |
| 7,556,836 B2 | 7/2009 | Mueller et al. | |
| 7,814,338 B2 | 10/2010 | Johnson | |
| 2001/0041202 A1 * | 11/2001 | Dupont et al. | 426/407 |
| 2004/0037943 A1 | 2/2004 | Saylock et al. | |
| 2005/0031673 A1 | 2/2005 | Saylock et al. | |

FOREIGN PATENT DOCUMENTS

| | | |
|---|---|---|
| EP | 0 258 037 A | 3/1988 |
| EP | 1527699 | 5/2005 |
| EP | 1618791 | 1/2006 |
| GB | 1 486 864 A | 9/1977 |
| GB | 1486864 A | 9/1977 |
| GB | 2 041 717 A | 9/1980 |
| GB | 1583644 | 1/1981 |
| JP | H7-313071 | 12/1995 |
| JP | 2003-144060 | 5/2003 |
| WO | WO 9805218 A1 * | 2/1998 |
| WO | WO 99/45794 | 9/1999 |
| WO | 2006127744 | 11/2006 |

OTHER PUBLICATIONS

All Office Actions, U.S. Appl. No. 11/433,275.
All Office Actions, U.S. Appl. No. 11/433,001.
Anon, "RD207031A", Jul. 1981.

* cited by examiner

*Primary Examiner* — Chhaya Sayala
(74) *Attorney, Agent, or Firm* — Mars, Incorporated; Colleen Kramer

(57) ABSTRACT

The coated pet food product of the present invention has more appeal to a consumer and ease of access for a pet. The coated pet food product contains a edible core; wherein said edible core has a Moisture Content of from about 16% to about 92%.

17 Claims, No Drawings

COATED PET FOOD PRODUCTS

CROSS REFERENCE TO RELATED APPLICATIONS

This application claims the benefit of U.S. Provisional Application No. 60/682,901, filed May 20, 2005.

FIELD OF THE INVENTION

The present invention relates to a coated pet food, that presents a desirable appearance to a consumer, improved texture, and easy to access and manage by a pet.

BACKGROUND OF THE INVENTION

Pet foods are generally manufactured and available in dry, moist and semi-moist formulations. Pet foods may be prepared from proteinaceous materials such as meat, including meat by-products or fish. Pet foods can further be formed from a combination of farinaceous materials, such as wheat or other grains, or proteinaceous materials. While flavorings and aroma modifiers are used to improve palatability, uncoated pet foods often suffer from lack of appeal to consumers. Other disadvantages of the current components of pet foods include undesirable color, unpleasant odor and hard cores that do not appear to be real meat products.

Several attempts for improving the palatability of pet food to pets and consumer appeal of pet food have been undertaken. One such attempt provides for a farinaceous core that is covered with a coating of slurried liver, which is then dried on the surface for the core to improve the palatability of the final product and to impart a gloss to the product.

In another attempt, an animal food product comprising a palatability enhancing material is applied to a nutritionally balanced animal food product as a dusting in order to enhance the palatability of the pet food product.

While much effort has been made to produce an appealing meat product that is attractive and easy to access and manage by a pet and palatable to a pet, the need still remains for a pet food product that shows the coherence exhibited by natural meat products with improved texture in the core and overall product while still maintaining appeal to a consumer and ease of access for a pet.

It is therefore an object of the present invention to provide a pet food product that is a desirable appearance to a consumer and easy to access and manage by a pet. This pet food product allows for a product that is attractive in appearance, provides improved texture, conceals odor, forms an ergonomically improved pet food product and enables softness to a pet food product.

SUMMARY OF THE INVENTION

The present invention relates to a coated pet food product comprising: an edible core; wherein said edible core having a Moisture Content of from about 16% to about 92%.

The present invention further relates to an edible core; and wherein the product has a Solid Fraction of from about 0.00003 to about 1.

The present invention further relates to a coated pet food product comprising: an edible core; a filler; and wherein said filler has a Viscosity of from about 0.02 to about 1000 Pa-s$^n$.

DETAILED DESCRIPTION OF THE INVENTION

The coated pet food product of the present invention comprises an edible core; wherein said edible core has a Moisture Content of from about 16% to about 92%.

These and other limitations of the compositions and methods of the present invention, as well as many of the optional ingredients suitable for use herein, are described in detail hereinafter.

As used herein, the term "adapted for use" means that the pet food products described can meet the American Association of Feed Control Officials (AAFCO) safety requirements for providing pet food products for a pet as may be amended from time to time.

As used herein, the term "agglomerate(s)", unless otherwise specified, can comprise a plurality of particles wherein the particles can be physically and/or chemically, irreversibly and/or reversibly, adhered together to form a discrete body of matter. As used herein, the term "adhered", unless otherwise specified, means the particles are physically and/or chemically bound or bonded together.

As used herein, "associated with the" "edible core" or "product" or "agglomerate", unless otherwise specified, means a coating that is applied to or inside of the edible core, product or agglomerate, permeated into the edible core, product or agglomerate, coated onto, or within or adjacent to the edible core, product or agglomerate or integral to the edible core, product or agglomerate or embedded to the edible core, product or agglomerate. The first or additional coating may also be "associated with the" with the edible core and/or agglomerate in whole or in part.

The term "complete and nutritionally balanced" as used herein, unless otherwise specified, refers to a pet food product having all known required nutrients in proper amounts and proportions based upon the recommendation of recognized authorities in the field of pet nutrition.

As used herein, the term "edible core" means a material intended for use in a pet food that has been processed, manipulated, or formed into an object of visible shape and of definable dimensions whether regular or irregular.

As used herein, the term "bonded" means substantially attached in such a manner that the first or additional layer and/or agglomerate, as applicable, is applied to or inside of the edible core, permeated into the edible core, coated onto, within or adjacent to the edible core or integral to the edible core or embedded to the edible core. The first or additional layer may also be "bonded" with the agglomerate. The first or additional layer may also be "bonded" with the edible core and/or agglomerate in whole or in part. Accordingly, a first or additional layer may be "bonded" with the edible core and/or agglomerate to vary the size, shape and overall appearance of the coated pet food product. Additionally, a first or additional agglomerate may be "bonded" with a second or additional agglomerate.

The term "Shear Index" or "n" as used herein is a measure of viscosity and is used in combination with Consistency value, to define viscosity for materials whose viscosity is a function of shear rate. The measurements are made at 21.5° C. and the units of Shear Index are dimensionless and Consistency values are Pascal-seconds (Pa-s$^n$).

As used herein the term "wet" means the coated pet food product can be moist and/or semi-moist.

All percentages, parts and ratios as used herein are by weight of the total product, unless otherwise specified. All such weights as they pertain to listed ingredients are based on the active level and, therefore do not include solvents or by-products that may be included in commercially available materials, unless otherwise specified.

The coated pet food product and methods of the present invention can comprise, consist of, or consist essentially of, the essential elements and limitations of the invention described herein, as well as any additional or optional ingredients, components, or limitations described herein or otherwise useful in coated pet food product intended for animal consumption.

Product Form

The coated pet food product of the present invention is typically in the form of a wet pet food product. The wet pet food products of the present invention can be a semi-moist pet food products (i.e. those having a total moisture content of from 16% to 50%, by weight of the product), and/or a moist pet food products (i.e. those having a total moisture content of greater than 50%, by weight of the product). Unless otherwise described herein, semi-moist pet food product, and moist pet food products are not limited by their composition or method of preparation.

The coated pet food product can comprise a continuous matrix that can comprise a filler. The coated pet food can comprise a discontinuous matrix that can comprise an edible core, a coating, a first layer, an agglomerate, optional ingredients and combinations thereof. The coated pet food product has a Solid Fraction of from about 0.00003 to about 1. Preferably the Solid Fraction value is from about 0.0003 to about 0.98, more preferably from about 0.003 to about 0.88, even more preferably from about 0.03 to about 0.75, as measured by the as measured by the Solid Fraction Test Described hereafter.

The coated pet food product has a Weight Fraction of from about 0.00003 to about 1. Preferably the Weight Fraction value is from about 0.0003 to about 0.98, more preferably from about 0.003 to about 0.88, even more preferably from about 0.03 to about 0.75, as measured by the as measured by the Weight Fraction Equation Described hereafter.

The coated pet food products herein can be complete and nutritionally balanced. A complete and nutritionally balanced coated pet product may be compounded to be fed as the sole ration and is capable of maintaining the life and/or promote reproduction without any additional substance being consumed, except for water.

The coated pet food product and components of the present invention are selected for consumption by a pet and are not intended for consumption by humans. Non-limiting examples of coated pet food products include dog food products and cat food products.

The present invention enhances ease of access and manageability by a pet with improved attractiveness to a consumer and provides improved texture and palatability. The coating improves the attractiveness to the consumer as well as the pet. The coated pet food product is preferably housed in a containing device comprising a substantially transparent portion suitable for viewing the coated pet food product.

Edible Core

The coated pet food product comprises an edible core. The edible core has a Moisture Content in the range of from about 16% to about 92%. Preferably the Moisture Content of at least about 20%, more preferably at least about 25%, even more preferably at least about 30%, even more preferably at least about 35%, still more preferably at least about 40%, still even more preferably at least about 50%, still even more preferably at least about 60%, still even more preferably at least about 70%, as measured by the Moisture Content Method described hereafter.

The edible core has a density of from about 0.1 to about 3 g/cc, preferably at least about 0.8 g/cc, more preferably at least about 1.01 g/cc, even more preferably at least about 1.02 g/cc, still even more preferably at least about 1.04 g/cc as measured by the Density Method described hereafter.

The edible core has a volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

The edible core can have a coating associated with the edible core. Additionally, the edible core can have a first layer bonded to the edible core. In an embodiment of the present invention the edible core can have a coating associated with the edible core and a first layer bonded to the edible core.

When the edible core has a coating associated with the edible core, the edible core has a density of from about 0.1 to about 3 g/cc, preferably at least about 0.8 g/cc, more preferably at least about 1.01 g/cc, even more preferably at least about 1.02 g/cc, still even more preferably at least about 1.05 g/cc as measured by the Density Method described hereafter.

When the edible core has a coating associated with the edible core, the edible core has a Volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

When the edible core has a coating associated with the edible core and a first layer bonded to the edible core, the edible core has a Density of from about 0.1 to about 3 g/cc, preferably at least about 0.8 g/cc, more preferably at least about 1.01 g/cc, even more preferably at least about 1.02 g/cc, still even more preferably at least about 1.05 g/cc as measured by the Density Method described hereafter.

When the edible core has a coating associated with the edible core and a first layer bonded to the edible core, the edible core has a Volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

When the edible core has a first layer bonded to the edible core, the edible core has a Density of from about 0.1 to about 3 g/cc, preferably at least about 0.8 g/cc, more preferably at least about 1.01 g/cc, even more preferably at least about 1.02 g/cc, still even more preferably at least about 1.05 g/cc as measured by the Density Method described hereafter.

When the edible core has a first layer bonded to the edible core, the edible core has a Volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

The edible core comprises a structurant. The structurant is selected from the group consisting of animal protein, plant protein, farinaceous matter, vegetables and combinations thereof.

The edible core can be processed by a variety of well-known means including steam tunnel, extrusion, freeze-texturization, baking, gelling, retort, microwave heating and combinations thereof. The structurant can be an extruded protein. The edible core can be a cube, irregular, elongated, cylindrical, spherical, geometric shapes, axially elongated, and combinations thereof.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

The animal protein described above can contain significant levels of microbes. These microbes must be killed before commercial distribution. A variety of well-known techniques are available for this purpose. Non-limiting examples include; heating, pressurizing, and shearing.

A First Layer

The coated pet food product can comprise a first layer. The first layer can comprise a plurality of particles. The plurality of particles can be adhere together to form a first layer. Methods of adhering the plurality of particles include, but are not limited to, compressing, molding, shaking, extruding, heating, ultrasound, and combinations thereof. Wherein the particles can be physically and/or chemically adhere. The particles can be at least about 5 to about 50000 microns in size, as measured in at least one axis.

The first layer can be bonded with the edible core. For example in an embodiment having the first layer bonded with the edible core a stable coated food product is formed. A coating, as described hereafter, can also be used when a first layer is bonded with a edible core.

Preferably the first layer will resist abrasion when bonded with an edible core. This is determined by measuring the bulk weight loss of the first layer as the layer is abraded from the edible core. The Abrasion of the coated edible core is less than about 98%, preferably less than about 50%, more preferably less than about 35%, even more preferably less than about 20%, still even more preferably less than about 10% as measured by the Abrasion Test Described Hereafter.

The methods of bonding the first layer with the edible core of the present invention, include, but are not limited to, compressing, molding, shaking, extruding, heating, and combinations thereof. The resulting coated pet food product can have varying shapes, sizes and appearance.

The first layer is selected from the group consisting of animal protein, plant protein, farinaceous matter, vegetables, fruit and combinations thereof. The first layer can be processed by a variety of well-known means including steam tunnel, extrusion, freeze-texturization, baking, gelling, retort, and combinations thereof. Examples of the first layer include steam tunnel meat, extruded meat, partially cooked meat, baked meat, gelled meat, retort processed meat and combinations thereof. The first layer can be shredded from about 0.005 millimeters to about 50 millimeters in size, as measured in at least one axis, preferably from about 0.05 millimeters to about 30 millimeters in size, more preferably from about 0.3 millimeters to about 10 millimeters in size, as measured in at least one axis.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal, or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein, for example a textured wheat protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, soy, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

Fruits are commonly known in the pet food industry. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

Coating

The coated pet food product comprises a edible core that can have a first coating associated with the edible core. The coating can comprise a binder.

When present, the coating comprises from about 0.01% to about 100%, by weight of the coating, of said binder. Preferably the coating comprises from about 1% to about 50%, more preferably from about 2% to about 35%, even more preferably from about 4% to about 20%, by weight of the coating, of said binder.

Nonlimiting examples of binders include egg-based materials (including egg whites and preferably dried egg whites), undenatured proteins, food grade polymeric adhesives, gels, polyols, starches (including modified starches), gums, and mixtures thereof.

Nonlimiting examples of polyols include sugar alcohols such as disaccharides and complex carbohydrates. Certain complex carbohydrates are referred commonly as starches. Disaccharides are molecules having the general formula $C_nH_{2n-2}O_{n-1}$, wherein the disaccharide has 2 monosaccharide units connected via a glycosidic bond. In such formula, n is an integer equal to or greater than 3.

Nonlimiting examples of disaccharides which may be utilized herein include sucrose, maltose, lactitol, maltitol, maltulose, and lactose.

Nonlimiting examples of complex carbohydrates include oligosaccharides and polysaccharides. As used herein, the term "oligosaccharide" means a molecule having from 3 to 9 monosaccharide units, wherein the units are covalently connected via glycosidic bonds. As used herein, the term "polysaccharide" means a macromolecule having greater than 9 monosaccharide units, wherein the units are covalently connected via glycosidic bonds. The polysaccharides may be linear chains or branched. Preferably, the polysaccharide has from 9 to about 20 monosaccharide units. Polysaccharides may include starches, which is defined herein to include starches and modified starches. Starches are generally carbohydrate polymers occurring in certain plant species, for example, cereals and tubers, such as corn, wheat, rice, tapioca, potato, pea, and the like. Starches contain linked alpha-D-glucose units. Starches may have either a mainly linear structure (e.g., amylose) or a branched structure (e.g., amylopectin). Starches may be modified by cross-linking to prevent excessive swelling of the starch granules using methods well-known to those skilled in the art. Additional examples of starches include potato starch, corn starch, and the like. Other examples of commercially available starches include ULTRA SPERSE M™, N-LITE LP™, and TEXTRA PLUS™, all available from National Starch and Chemical Company, Bridgewater, N.J.

Nonlimiting examples of preferred complex carbohydrates include raffinose, stachyoses, maltotriose, maltotetraose, glycogen, amylose, amylopectin, polydextrose, and maltodextrin.

The coating can optionally further comprise an additional component. Nonlimiting examples of additional components include wheat protein, soy protein, lupin protein, protein flour, textured wheat protein, textured soy protein, textured lupin protein, textured vegetable protein, breading, comminuted meat, flour, comminuted pasta, pasta, water, flavorants, starches, seasoning salts, colorants, time-release compounds, minerals, vitamins, antioxidants, prebiotics, probiotics, aroma modifiers, flavor modifiers, and combinations thereof.

Agglomerates

The coated pet food product of the present invention can comprise a agglomerate and/or one or more additional agglomerates. An agglomerate can comprise a plurality of particles wherein the particles are adhered together to form the agglomerate. The agglomerate can be bonded with the edible core which can change the shape, size, texture, appearance, density and volume of the edible core.

The coated pet food product of the present invention may comprise one or more additional agglomerate that can be bonded with the product, edible core and/or another agglomerate which one having ordinary skill in the art would recognize as separate and distinct from the first agglomerate. These additional agglomerates may also be referred to as consecutively numbered agglomerates in addition to the first agglomerates of the present invention, e.g., second agglomerates, third agglomerates, etc.

An agglomerate can be a variety of sizes and shapes. The agglomerate can have a volume of from about 0.004 cc to about 3600 cc, preferably from about 0.024 cc to about 442 cc, more preferably from about 0.108 cc to about 131 cc, even more preferably from about 0.256 cc to about 16.4 cc., as measured by the Volume Method described hereafter.

The agglomerate has a density of from about 0.05 to about 3 g/cc, preferably at least about 0.3 g/cc, more preferably at least about 0.8 g/cc, even more preferably at least about 1.01 g/cc, still even more preferably at least about 1.06 g/cc as measured by the Density Method described hereafter.

The agglomerate can comprise a plurality of particles that is selected from the group consisting of animal protein, plant protein, farinaceous matter, vegetables, fruit and combinations thereof. The particles can be processed by a variety of well-known means including steam tunnel, extrusion, freeze-texturization, baking, gelling, retort, and combinations thereof. Examples of the particles include steam tunnel meat, extruded meat, partially cooked meat, baked meat, gelled meat, retort processed meat and combinations thereof.

The animal protein may be derived from any of a variety of animal sources including, for example, muscle meat or meat by-product. Nonlimiting examples of animal protein include beef, pork, poultry, lamb, kangaroo, shell fish, crustaceans, fish, and combinations thereof including, for example, muscle meat, meat by-product, meat meal, or fish meal.

The plant protein may be derived from any of a variety of plant sources. Nonlimiting examples of plant protein include lupin protein, wheat protein, soy protein, and combinations thereof. A portion, or all of the plant protein when present, can be a texturized protein, for example a textured wheat protein.

The farinaceous matter is commonly known in the pet food industry. Nonlimiting examples of farinaceous matter include grains such as, rice, corn, milo, sorghum, barley, and wheat, and the like, pasta (for example, ground pasta), breading, soy, and combinations thereof.

Vegetables are commonly known in the pet food industry. Nonlimiting examples of vegetables include peas, carrots, corn, potatoes, beans, cabbage, tomatoes, celery, broccoli, cauliflower, and leeks.

Fruits are commonly known in the pet food industry. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

The agglomerates can optionally further comprises an additional component. Nonlimiting examples of additional components include textured wheat protein, textured soy protein, textured lupin protein, textured vegetable protein, breading, comminuted meat, flour, comminuted pasta, water, flavorants, seasoning salts, colorants, time-release compounds, minerals, vitamins, antioxidants, prebiotics, probiotics, aroma modifiers, flavor modifiers, and combinations thereof.

Filler

The coated pet food product of the present invention can comprise a continuous matrix that can comprise a filler. The filler can be a solid, a liquid or packed air. The filler can be reversible (for example thermo-reversible including gelatin) and/or irreversible (for example thermo-irreversible including egg white). Nonlimiting examples of the filler include gravy, gel, jelly, aspic, sauce, water, air (for example including nitrogen, carbon dioxide, and atmospheric air), broth and combinations thereof.

When the filler is liquid, the Consistency Value (K) is from about 0.02 to about 1000 Pa-s$^n$, preferably from about 0.01 to about 600 Pa-s$^n$, more preferably from about 0.1 to about 400 Pa-s$^n$, even more preferably from about 0.2 to about 100 Pa-s$^n$, still more preferably from about 0.3 to about 13 Pa-s$^n$, as measured by the Viscosity Method described hereafter.

When the filler is liquid, the Shear Index (n) is from about 0.001 to about 4, where n is dimensionless, preferably from about 0.01 to about 3, more preferably from about 0.1 to about 2, even more preferably from about 0.2 to about 1, as measured by the Viscosity Method described hereafter.

The filler can optionally further comprise an additional component. Nonlimiting examples of additional components include wheat protein, soy protein, lupin protein, protein flour, textured wheat protein, textured soy protein, textured lupin protein, textured vegetable protein, breading, comminuted meat, flour, comminuted pasta, pasta, water, flavorants, starches, seasoning salts, colorants, time-release compounds, minerals, vitamins, antioxidants, prebiotics, probiotics, aroma modifiers, flavor modifiers, and combinations thereof.

Colorant

The coated pet food product of the present invention can comprise one or more colorant. Nonlimiting examples colorants include, but are not limited to, synthetic or natural colorants, and any combination thereof. A colorant can be malt for brown coloring, titanium dioxide for white coloring, or tomato extract (e.g. lycopene) for red coloring, alalpha (e.g. chlorophyll) for green coloring, algal meal for green coloring, caramel for brown coloring, annatto extract (e.g. bixin, transbixin, and norbixin and combinations thereof) for about yellow-orange color, dehydrated beets for about red-purple coloring, ultramarine blue for about blue-green color, β-carotene for about orange coloring, tagetes (e.g. lutein) for about orange coloring, tumeric for about yellow coloring, tumeric oleoresin for about yellow coloring, saffron for about yellow coloring, corn gluten meal for about yellow coloring, paprika for about red coloring, paprika oleoresin for about orange-red coloring, black iron oxide for about black coloring, brown iron oxide for about brown coloring, red iron oxide for about red coloring, yellow iron oxide for about yellow coloring, red cabbage for about red-purple coloring, carbon black for about black coloring, cochineal extract for about red coloring, carrot oil for about yellow coloring, FD&C Blue No. 1 (Brilliant Blue) for about green-blue coloring, FD&C Blue No. 2 (Indigotine) for about a deep blue coloring, FD&C Green No. 3 (Fast Green) for about blue-green coloring, FD&C Red No. 3 (Erythrosine) for about blue-red coloring, FD&C Red No. 40 (Allura Red) for about yellow-red coloring, FD&C Yellow No. 5 (Tartrazine) for about lemon-yellow coloring, FD&C Yellow No. 6 (Sunset Yellow) for about red-yellow coloring, fruit juice concentrate for inherent coloring (e.g. orange juice concentrate for about orange coloring), grape color extract for red-blue coloring, xanthophylls (e.g. extracted from broccoli) for about green coloring, vegetable juice for inherent coloring (e.g. beet juice for red-purple coloring), riboflavin for about green-yellow coloring, Orange B for about orange coloring, and octopus and squid ink for about black coloring The coated pet food product comprises from about 0.00001% to about 10%, by weight of the product, of said colorant. Preferably coated pet food product comprises from about 0.0001% to about 5%, more preferably from about 0.001% to about 1%, even more preferably from about 0.005% to about 0.1%, by weight of the product, of said colorant.

A benefit can be achieved by providing an alternate color to the edible core by associating the edible core with coatings (e.g. first coating, second coating, third coating, etc.), the edible core bonded layers (e.g. first layer, second layer, etc.), and the edible core bonded agglomerates (e.g. first agglomerate, second agglomerate, third agglomerate, etc). Further benefit can be achieved by providing variety or similarity using edible cores, coatings, layers, and agglomerates. For example, color difference can be used to describe the likeness of coating color or layer color to agglomerate color.

In an embodiment of the present invention, the coated pet food product and/or the agglomerate comprises a colorant such that the coating and/or first layer result in a visible color difference between the edible core and the coating and/or edible core and first layer and/or edible core and agglomerate and/or first layer and optional ingredients, and/or coating and optional ingredients. The measured difference is from about 0.001 to about 99, preferably from about 0.01 to about 70, more preferably from about 0.1 to about 50, even more preferably from about 1 to about 30, as measured by the Color Method described hereafter.

Additional Layers

In another embodiment, the coated pet food product of the present invention and/or the agglomerates of the present invention may comprise one or more additional layers that can be bonded with the product, edible core and/or the agglomerate which one having ordinary skill in the art could recognize as separate and distinct from the first layer. These additional layers may also be referred to as consecutively numbered layers in addition to the first layer of the present invention, e.g., second layer, third layer, etc. Suitable additional layers may comprise those materials which are disclosed above as suitable for the first layer.

Additional Coatings

In another embodiment, the coated pet food product of the present invention and/or the agglomerates of the present invention may comprise one or more additional coatings that can be associated with the product, edible core and/or the agglomerate which one having ordinary skill in the art could recognize as separate and distinct from the first coating. The additional coating can provide a non-glossy appearance to the surface of the coated pet food product and/or agglomerate, thereby providing a coated pet food product with improved appearance of freshness and improved attractiveness to one or both of the consumer or the pet. In any instance, these additional coatings may also be referred to as consecutively numbered coatings in addition to the first coating of the present invention, e.g., second coating, third coating, etc. Suitable additional coating may comprise those materials which are disclosed above as suitable for the first coating.

Optional Ingredients

The coated pet food product of the present invention can further comprise a wide range of other optional ingredients. These optional ingredients can be present as part of the agglomerate and/or additional agglomerates, edible core, coating, first and or additional layers.

Nonlimiting examples of optional ingredients can include at least one vegetable. Nonlimiting examples of vegetables include carrots, peas, potatoes, cabbage, celery, beans, corn, tomatoes, broccoli, cauliflower, onion, garlic, leeks and combinations thereof.

Also useful herein, as an optional ingredient, is one or more additional components. Nonlimiting examples include textured wheat protein, textured soy protein, textured lupin protein, textured vegetable protein, breading, comminuted meat, flour, comminuted pasta, water, flavorants, seasonings, salts, time-release compounds, minerals, vitamins, antioxidants, prebiotics, probiotics, aroma modifiers, and combinations thereof.

Also useful herein, as an optional ingredient, is at least one fruit. Nonlimiting examples include tomatoes, apples, avocado, pears, peaches, cherries, apricots, plums, grapes, oranges, grapefruit, lemons, limes, cranberries, raspberries, blueberries, watermelon, cantelope, mushmellon, honeydew melon, strawberries, banana, and combinations thereof.

Method of Manufacture

The coated pet food product of the present invention may be prepared by any known or otherwise effective technique, suitable for making and formulating the desired coated pet food product. It is effective to manufacture the coated pet food product comprising the process of: (a) providing a edible core; (b) providing a first layer; (c) associating a coating with said edible core; (d) bonding said edible core and said first layer; (e) heating said pet food product until said coating is heat set; and (f) heating said pet food product until all microbes are killed. The coated pet food product can optionally have a second layer or coating bonded with the edible core.

Alternatively, it is effective to manufacture the coated pet food product comprising the process of: (a) providing a edible core; (b) providing a first agglomerate; (c) associating a coating with said first agglomerate; (d) bonding a second agglomerate; (e) heating said pet food product until said coating is heat set; and (f) heating said pet food product until all microbes are killed. The coated pet food product can optionally comprise a third agglomerate bonded to said edible core and/or bonded to said second agglomerate.

Alternatively, it is effective to manufacture the coated pet food product comprising the process of: (a) providing a said edible core; (b) providing a first agglomerate; (c) associating a coating with said first agglomerate; (d) associating a coating with said edible core; (e) bonding a first agglomerates with said edible core; (f) heating said pet food product until said coating is heat set; and (g) heating said pet food product until all microbes are killed.

It should be understood that every maximum numerical limitation given throughout this specification includes every lower numerical limitations as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

All parts, ratios, and percentages herein, in the Specification, Examples, and Claims, are by weight and all numerical limits are used with the normal degree of accuracy afforded by the art, unless otherwise specified.

Methods

Solid Fraction Test

The coated pet food product can comprise a continuous matrix and a discontinous matrix. The matrices are separated using the Solid Fraction Test and the Solid Fraction of the coated pet food product is determined.

If the coated pet food product is in a package, the initial weight of a package and contents of coated pet food product is recorded. The dry weight of the following sieves is recorded: US#20, US#4, and US#18. Sieves are selected to have soldered seams to eliminate trapping of free water and product. The product is removed from the package by emptying the product (for example by pouring and/or lightly scraping the sides of the package) and placed on the US#4 sieve (A.S.T.M.E.-11 specification, 4.75 mm square opening). The US#4 sieve is placed atop the US#18 sieve (A.S.T.M.E.-11 specification, 1.00 mm square opening). For packages up to 600 g, 20.32 cm diameter and full-height A.S.T.M. sieves are sufficient. Larger package sizes will require replication and summation of the data until the entire product is assessed via this test. The package is rinsed to free product clinging to the interior surfaces of the package. This rinse water is poured atop the US#4 sieve to begin the rinsing step and capture product previously retained in the package. The rinse water is 20-23° C. The package is dried and the empty package weight is recorded. The coated pet food product weight is calculated via Equation I:

$$\text{coated pet food product weight (g)} = \text{Initial package weight (g)} - \text{Empty package weight (g)} \quad \text{Equation I}$$

Next, the US#4 sieve is covered with the US#20 sieve (A.S.T.M.E.-11 specification, 0.850 mm square opening). The sieve stack comprising the US#4 sieve, US#20 sieve, and US#18 sieve is immersed completely in a 25.4 cm pool of water at 20-23° C. and removed from the water a total of 30 times (cycles) in 40 seconds. The action gently removes components in the discontinuous matrix that are less than or equal to 4.75 mm in size from components in the discontinuous matrix that are greater than 4.75 mm in size. The sieves are separated and the discontinuous matrix on the US#4 sieve is inspected visually for clinging residue of the continuous matrix. If the continuous matrix still appears present, the 30 cycles are repeated for a total of 60 cycles; the process being repeated as many as 4 times until the discontinuous matrix is essentially free of the continuous matrix.

Next, the sieve stack is dropped from a height of 1 inch 3 times. The sieve stack is separated in a manner to retain the quality and quantity of the discontinuous matrix on each sieve. Each sieve is dried on the upper and lower rim, and the underside of the screen. The final weight of each sieve is recorded. The following Equations are performed to determine the size fractions of components:

$$\text{Weight of discontinuous matrix (g)} > 4.75 \text{ mm} = \text{Weight of components in the discontinuous matrix on US\#4 sieve} - \text{Dry weight of US\#4 sieve.} \quad \text{Equation II}$$

$$\text{Weight of components in the discontinuous matrix (g)} \leq 4.75 \text{ mm} = \text{Weight of components in the discontinuous matrix on US\#18 sieve} - \text{Dry weight of US\#18 sieve.} \quad \text{Equation III}$$

Solid Fraction is calculated on a weight basis as follows:

$$\text{Solid Fraction } (A) = \text{Weight of discontinuous matrix (g)} > 4.75 \text{ mm/coated pet food product weight (g)} \quad \text{Equation IV}$$

$$\text{Solid Fraction } (B) = \text{Weight of discontinuous matrix (g)} \leq 4.75 \text{ mm/coated pet food product weight (g)}$$

$$\text{Solid Fraction of Coated Pet Food Product} = (A) + (B) \quad \text{Equation V}$$

Weight Fraction Test

The coated pet food product can comprise an edible core, edible core associated with coating and/or bonded layer, agglomerate (e.g. first agglomerate, second agglomerate, third agglomerate, etc.), filler, and optional ingredients. Based on formula weight, Weight Fraction of Filler is calculated using Equation I. Filler is the continuous matrix. Based on Weight Fraction of Filler, the Weight Fraction of Coated Pet Food Product is calculated using Equation II. In the case of more than one filler present, the Weight Fraction of Multiple Fillers from Equation III is used to calculate the Weight Fraction of Coated Pet Food Product using Equation IV.

$$\text{Weight Fraction of Total Filler} = \text{Weight of Filler in formula (g)/Total Weight of Coated Pet Food Product in formula (g)} \quad \text{Equation I}$$

$$\text{Weight Fraction of Coated Pet Food Product in formula} = 1 - \text{Weight Fraction of Filler in formula (g)} \quad \text{Equation II}$$

$$\text{Weight Fraction of Total Filler} = (\text{Weight of First Filler in formula (g)} + \text{Weight of Second Filler (g)} + \text{Weight of Third Filler (g)} + \text{etc.})/\text{Total Weight of Coated Pet Food Product in formula (g)} \quad \text{Equation III}$$

$$\text{Weight Fraction of Coated Pet Food Product in formula} = 1 - \text{Weight Fraction of Total Filler in formula (g)} \quad \text{Equation IV}$$

Density Method

This method measures density of the edible core and/or an agglomerate (e.g. first agglomerate, second agglomerate, third agglomerate) (i.e. sample). Further, this method measures density of edible core associated with coatings (e.g. first coating, second coating, third coating) and/or bonded layers (e.g. first layer, second layer) and/or agglomerate (e.g. third agglomerate) (i.e. sample). Density is assessed via immersion in distilled water at 21.5° C. using, for example, a Density Determination Kit available from Mettler-Toledo, Inc. Columbus, Ohio, USA.

The apparatus for measuring density of the edible core and/or the agglomerate via immersion in a fluid is described herein. An analytical balance, precise to at least 0.001 g, has the top loading balance pan removed. Affixed on the balance pan is the frame. If the analytical balance is equipped with a guard along the perimeter of the pan, the guard is removed as to not interfere with placement of the pan and frame on the balance load cell. The pan and frame assembly are placed on the balance load cell. A platform is placed astraddle the pan and not touching the frame or the pan. A beaker (e.g. 500 ml) is filled with 21.5° C. distilled water (e.g. 500 ml). The beaker and water are placed on the platform in a manner to not touch the frame, preferably centered. Two sample stages are used in this step. The upper sample stage (upper stage) is affixed at the upper center and horizontal portion of the frame. The lower sample stage (lower stage) should be submerged to a depth sufficient so that when a sample is placed on the lower stage the sample is submerged completely. A thermometer is affixed along the inside wall of the beaker. Once equilibrated, the temperature of the distilled water is recorded from the thermometer. The analytical balance is tared.

If need be, beaker size, scale size, and water depth can be adjusted for edible core and/or agglomerate weight and different sizes.

i. Non-Floating Edible Core and/or Agglomerate

The edible core and/or agglomerate weight is determined when placed at each stage location. Using forceps with minimal grasping force, the edible core and/or agglomerate is placed on the upper sample stage. The weight is recorded as the Weight of the edible core and/or agglomerate in Air (A). Using forceps with minimal grasping force, the edible core and/or agglomerate is removed from the upper sample stage, the analytical balance is tared, and the edible core and/or agglomerate is placed on the lower sample stage so that the edible core and/or agglomerate is completely submerged and is freely resting on the lower sample stage. The edible core and/or agglomerate is positioned to be freely resting on the lower sample stage so that all weight is carried by the lower sample stage. If the edible core and/or agglomerate remains on the lower sample stage, the Weight of the edible core and/or agglomerate in Distilled Water (W) is recorded.

ii. Floating Edible Core and/or Agglomerate

If the edible core and/or agglomerate floats to the surface, the edible core and/or agglomerate is removed from the distilled water. The lower sample stage is replaced with a buoyant body sample stage. The buoyant body sample stage is perforated to allow trapped air to float to the surface of the water but with perforations smaller than the edible core and/or agglomerate. When the buoyancy of the edible core and/or agglomerate is greater than the weight of the buoyancy body sample stage, the buoyant body sample stage must be weighted by placing an additional weight on top of the upper stage such that the buoyant body sample stage, the upper stage with wieght, and frame act as one unit with no moving parts. Tare the balance and conduct the density measurement as above (i) for non-floating edible core and/or agglomerate. A new edible core and/or agglomerate is chosen, and the step is repeated to determine and record the Weight of the edible core and/or the agglomerate in Air (A) on the upper sample stage, the balance is tared, and then subsequent weight immersed (W), where W is now a negative number and is recorded as such.

The density of distilled water at 21.5° C. is 0.99788 based on standard pressure conditions of 1 atmosphere.

edible core and/or agglomerate density is calculated as follows:

edible core and/or agglomerate density (g/cc)=Density of distilled water×[(A)/(A−W)]

Volume Method

Volume is calculated based on the first principle relationship to density and mass. Using the values obtained from the Density Method discussed previously one can calculate the Volume of the edible core and/or agglomerate as described in the Density Method.

edible core and/or agglomerate Volume is calculated as follows:

edible core and/or agglomerate Volume (cc)=(A)(g)/edible core and/or agglomerate density (g/cc)

Moisture Content Method

The method involves the analysis of moisture content in the edible core and/or coated pet food product. The analysis is based on the procedure outlined in AOAC method 930.15 and AACC method 44-19.

A coated pet food product sample is prepared by taking one unit volume, for example, a 375 gram can of product, and homogenizing in a food processor to a uniform consistency like a paste. A coated pet food product sample larger than 375 gram would be subdivided to create equal and representative fractions of the whole such that a 375 gram sample is obtained.

Additionally, the moisture content of the edible core can be determined by obtaining an edible core sample for example from the process line. The edible core sample is handled in a manner to prevent spoilage or loss or gain of moisture. The edible core sample is processed so as to obtain a 375 gram sample. The edible core sample is homogenizing in a food processor to a uniform consistency like a paste.

The pastes of the coated pet food product and the edible core samples are individually sampled at a volume less than or equal to 100 ml and placed individually sealed in a 100 ml Nasco Whirl-Pak® (Fort Atkinson, Wis. 53538-0901). During the process of sealing the Whirl-Pak®, excess air is evacuated manually from the container just prior to final closure thereby minimizing the container headspace. The Whirl-Pak® is closed per manufacturer's instructions—tightly folding the bag over three (3) times and bending the tabs over 180 degrees.

All samples are refrigerated at 6° C. for less than 48 h prior to moisture analysis.

For moisture analysis, the tare weight of each moisture tin and lid are recorded to 0.0001 g. Moisture tins and lids are handled using dry and clean forceps. Moisture tins and lids are held dry over desiccant in a sealed desiccator. A Whirl-Pak® containing a sample is unfolded and a 2.0000+/−0.2000 gram sample is weighed into the uncovered moisture tin. The weight of the sample in the moisture tin is recorded. The lid is placed atop the moisture tin in an open position to allow moisture loss but contain all other material during air oven drying. The lid and moisture tin loaded with sample are placed in an air oven operating at 135° C. for 6 h. Time is tracked using a count-down timer.

After drying, the tin is removed from the oven and the dried lid is placed atop the tin using forceps. The covered moisture tin with dried sample is placed immediately in a desiccator to cool. The sealed desiccator is filled below the stage with active desiccant. Once cool to room temperature, the covered moisture tin with dried sample is weighed to 0.0001 g and weight recorded. The moisture content of each sample is calculated using the following formula:

Moisture Content (%)=100−(weight of tin, lid and sample after drying−empty tin and lid weight)× 100/initial sample weight Abrasion Test This method measures abrasion resistance of a coated pet food product. Abrasion is assessed by bulk loss-in-weight from a edible core, coating, first layer, agglomerate and/or additional layers or coatings.

Since for example edible core-coating, edible core-first layer, or coating-first layer, agglomerate-agglomerate, edible core-agglomerate and so on abrasion is one mechanism of wear, the weight of sample is specified for this method at 210 grams ±10 grams. The sample weight (IW) is recorded. As another mechanism of wear is due to edible core-vessel contact, coating-vessel contact, or first layer-vessel contact the size of the vessel is defined as a 8-inch (203.2 mm) diameter sieve. All sieves, pans, and lids are 8-inch diameter.

A Sample (210 gm) of like appearance and composition (i.e. a edible core sample, coating sample, first layer sample, agglomerate sample and/or additional layers or coatings samples) are placed on a US#4 sieve. The weight of damp sample on the sieve is determined via transfer from a tared weighing pan. This sieve and sample are placed atop a Tyler #6 sieve (A.S.T.M.E.-11 specification, 3.35 mm square opening) that is atop a full height pan. The US#4 sieve is covered with a lid. The sieve stack assembly, US#4 sieve and Tyler #6 sieve, is placed in a test sieve shaker (Ro-Tap model RX-29, W. S. Tyler, Mentor, Ohio 44060) that is adjusted to accommodate the sieve stack height and shaker cover. The Ro-Tap device is common to the industry and has a "unique two-dimensional operation: a horizontal, circular motion and a vertical, tapping motion." The horizontal circular motion is at frequency of 278 oscillations per minute with an oscillatory displacement of 25.4 mm×19.05 mm. Tapping occurs at a frequency of 150 taps per minute using a hammer weight of 2.438-kg contacting a natural cork fitted in the center of the shaker cover. The natural cork dimensions are about 44.45 mm top diameter×about 39.69 mm bottom diameter×about 25.4 mm high. Shaker duration is controlled using a digital timer.

The following shaker schedule is followed sequentially in this method with intermediate measurements to calculate the extent and rate of abrasion: 1 min, 2 min, 5 min and 15 min for a cumulative time of after 23 min. To begin, the weight of the US #4 sieve with sample is determined, the weight recorded as the starting weight (SW). After 23 minutes of tapping on the Ro-Tap, the US#4 sieve with sample is removed.

The loss-in-weight during the shaker step is recorded after rinsing fines from the surface of the sample. Rinsing is accomplished using a 3 sieve stack assembly as described in the Solid Fraction Method in a pool of 20-23° C. water deep enough to submerge: sieves US#20, US#4, and US#18. The largest portions of the sample are retained on sieve US#4. The underside of the sieve is dried using a paper towel. The largest portions of the sample are transferred to a weigh pan with sufficient base surface area to create a monolayer of sample. The weight of damp sample (WD) is determined via transfer from a tared weighing pan less residual weight (RW) remaining in the weighing pan from surface liquid.

The exterior surfaces of the US#4 sieve are dried using a paper towel. The damp sample is transferred from the weighing pan to the US#4 sieve. The residual weight of the wet weighing pan is recorded as (RW). The calculated difference between the weight of the damp sample (DW) and residual weight of the wet weighing pan (RW) is the Rinsed sample weight (RS).

$RS(g)=(DW)(g)-(RW)(g)$

Recorded rinsed sample weight data is used to calculate extent of abrasion as % abrasion.

Abrasion is expressed as the following:

% abrasion=$(IW(g)-RS(g))/(IW)(g)\times 100$

Viscosity Method

The Shear Index (n) and Consistency Value (K) are known and accepted means for reporting the viscosity profile of liquids having a viscosity that varies with applied shear rate using a Power Law model. This method applies to rheological characterization of the filler including as gravies, sauces, oils, broths, melted fats and solutions of irreversible gels.

The viscosity ($\eta$) can be measured by applying a shear stress and measuring the shear rate using a rheometer, such as a TA Instruments AR2000 (TA Instruments, New Castle, Del., USA 19720). Viscosity is determined at different shear rates in the following manner.

Samples are obtained from a coated pet food product as follows: i) for fillers at room temperature, the filler fraction is separated as the product passes through a US#20 sieve (A.S.T.M.E. specification, 850 mm square opening). To catch the filler passing through the US#20 sieve, a plastic bag is fitted loosely between the US#20 sieve and the Pan (solid non-perforated full-height pan). Minimal force is preferred to promote separation using the US#20 sieve; however for viscous filler (greater than 1 Pa-s at 25° C. and a shear rate of 0.2 inverse seconds (1/sec)), a 1 minute cycle with the Ro-Tap (as above, in the Abrasion Test) is employed. The filler is collected in the plastic bag-lined Pan below the US#20 sieve, the plastic bag removed with sample, and sealed to prevent moisture loss.

For measurement, a 40 mm diameter parallel plate geometry with a gap of 1.25 mm is used unless there are componnents greater than 0.25 mm, in which case a gap of 2.5 mm is used. Using a spatula, a sample is loaded onto the rheometer base plate which is at 25 degrees Celsius, the gap is obtained, and excess composition outside the top measurement geometry is removed, locking the top plate in position during the removal of excess sample. The sample is equilibrated to the base plate temperature for 2 minutes. A preshear step is performed comprising 15 seconds of shear at a shear rate of 50 inverse seconds (1/sec). As is known to one skilled in the art, the shear rate with a parallel plate geometry is expressed as the shear rate at the edge, which is also the maximum shear rate. After the preshear step, the measurement is performed, which comprises ramping the stress from 0.01 Pa to 1,000 Pa over a 5.0 minute interval at 25° C., while collecting 125 viscosity data points, in an evenly spaced linear progression. A shear rate of at least 300 1/seconds is obtained in the test, or the test is repeated with a fresh sample of the same component with a higher final stress value, maintaining the same rate of stress increase per time, until a shear rate of at least 300 1/sec is obtained during the measurement period. During the measurement, observe the sample to make certain the area under the top parallel plate is not evacuated of sample at any location during the measurement, or the measurement is repeated until a sample remains for the duration of the test. The results are fitted to the power law model by selecting only the data points between 10-300 1/sec shear rate, viscosity in Pa-s, shear rate in 1/sec, and using a least squares regression of the logarithm of viscosity vs. the logarithm of shear rate to obtain values of K and n according to the Power Law equation:

$$\eta=K(\gamma')^{(n-1)}$$

The value obtained for the log-log slope is (n−1) where n is the Shear Index (dimensionless) and the value obtained for K is the Consistency Value, expressed in units of Pa-s$^n$.

Color Method

Color is evaluated using the CIE (Commission Internationale d'Eclairage) 10° (1964) Standard Observer and D65 Illuminant (emulates daylight with an energy spectra down to 300 nm with a color temperature of 6500 Kelvin) with a reflectance colorimeter such as the Mercury 2000 spectrophotometer (Datacolor International, Lawrenceville, N.J. 08648) or Hunter Miniscan XE spectrocolorimeter (Hunter Associates Laboratory Inc., Reston, Va. 22090) capable of output expressed using the CIE L*a*b* three-dimensional scale; where L* corresponds to lightness on one-axis, a* corresponds to greenness (negative a* values) and redness (positive a* values) on a second axis, and b* corresponds to blueness (negative b* values) and yellowness (positive b* values) on the third axis. Color is expressed as a point in the three-dimensional space as (L*, a*, b*).

Color Difference (Delta E) is expressed mathematically as follows and describes the distance between two colors (e.g. point 1 v point 2) in three-dimensional color space (L*, a*, b*).

$$\text{Delta } E = [(L^*_1 - L^*_2)^2 + (a^*_1 - a^*_2)^2 + (b^*_1 - b^*_2)^2]^{0.5} \quad \text{Equation I.}$$

A 150 cc sample of each edible core, edible core associated with coating (e.g. first coating, second coating, third coating, etc.) or edible core bonded with a layer (e.g. first layer, second layer, etc.) and/or agglomerate (e.g. first agglomerate, second agglomerate, third agglomerate) is collected at 25° C. as prepared from a coated pet food product as described herein the Solid Fraction Test. Using digital calipers (e.g.) with the aid of magnification (e.g. 5×) such as a Zeiss Stereo Microscope (Stemi SR; West Germany), the total coating and/or layer thickness is recorded from a edible core cross-section (cut using sharp razor knife). Edible core samples can be prepared by cutting with a sharp razor knife to remove all coating and/or layer to a distance 1.5 times total coating and layer thickness from all surfaces. Cutting is checked using digital calipers and magnification (as above) and is within 10% of 1.5 times total coating and layer thickness.

The reflectance colorimeter is calibrated using manufacturer specifications (e.g. black tile and/or white tile) and should be equipped with a cleanable light source window to prevent contamination. Clean the window per manufacturer specifications.

Alternately calibration can be standardized with transparent cover (Petri dish cover about 1.6 mm thick) and subsequent testing performed by covering and contacting the sample with the transparent cover. Color measurements for L*, a*, and b* values are made through the transparent cover and recorded for each sample (see Table 1: Point 1 or Point 2).

The following color differences can be determined from Equation I in accordance with

TABLE I

| Color Difference Type | Point 1 | Point 2 |
|---|---|---|
| Edible core-Coating Color Difference | Edible core | Coating |
| Edible core-Layer Color Difference | Edible core | Layer |
| Edible core-Agglomerate Color Difference | Edible core | Agglomerate |
| Coating-Layer Color Difference | Coating | Layer |
| Coating-Agglomerate Color Difference | Coating | Agglomerate |
| Layer-Agglomerate Color Difference | Layer | Agglomerate |

EXAMPLES

The following examples further describe and demonstrate embodiments within the scope of the invention. The examples are given solely for the purpose of illustration and are not to be construed as limitations of the present invention, as many variations thereof are possible without departing from the spirit and scope of the invention.

A coated pet food product can be prepared utilizing the following:

| | Coated Pet Food Product Examples: | | | | | | |
|---|---|---|---|---|---|---|---|
| | Ex. 1 | Ex. 2 | Ex. 3 | Ex. 4 | Ex. 5 | Ex. 6 | Ex. 7 |
| Edible Core | Ex. 26 | Ex. 24 | Ex. 22 | | | | |
| Edible Core % | 26.65 | 22.63 | 23.27 | | | | |
| Edible Core + First Coating | | | | | | | |
| Edible core | | | | | Ex. 35 | | |
| Edible Core % | | | | | 26.65 | | |
| First Coating | | | | | Ex. 44 | | |
| First Coating % | | | | | 5.24 | | |
| Edible Core + First Layer | | | | | | | |
| Edible Core | | | | | Ex. 25 | | |
| Edible Core % | | | | | 26.78 | | |
| First Layer | | | | | Ex57 | | |
| First Layer % | | | | | 4.80 | | |
| Edible Core + First Coating + First Layer | | | | | | | |
| Edible Core | | | | | | Ex. 23 | |
| Edible Core % | | | | | | 25.94 | |
| First Coating | | | | | | Ex. 46 | |
| First Coating % | | | | | | 3.11 | |
| First Layer | | | | | | Ex. 60 | |
| First Layer % | | | | | | 4.65 | |
| Edible Core + First Coating + First Layer + Second Coating | | | | | | | |
| Edible Core | | | | | | | Ex. 24 |
| Edible Core % | | | | | | | 25.67 |
| First Coating | | | | | | | Ex. 43 |
| First Coating % | | | | | | | 3.08 |

-continued

Coated Pet Food Product Examples:

| | Ex. 1 | Ex. 2 | Ex. 3 | Ex. 4 | Ex. 5 | Ex. 6 | Ex. 7 |
|---|---|---|---|---|---|---|---|
| First Layer | | | | | | | Ex. 58 |
| First Layer % | | | | | | | 4.60 |
| Second Coating | | | | | | | Ex. 41 |
| Second Coating % | | | | | | | 1.06 |
| First Agglomerate | Ex. 37 | Ex. 38 | | | | | |
| First Agglomerate % | 5.25 | 13.76 | | | | | |
| Second Agglomerate | | | Ex. 48 | | | | |
| Second Agglomerate % | | | 17.27 | | | | |
| Filler | Ex. 81 | Ex. 80 | Ex. 81 | Ex. 79 | Ex. 77 | Ex. 82 | Ex. 85 |
| Filler % | QS | QS | QS | QS | QS | QS | QS |
| Optional Ingredients | Ex. 70 | Ex. 73 | Ex. 70 | Ex. 75 | Ex. 71 | Ex. 69 | Ex. 74 |
| Optional Ingredients % | 7.25 | 11.94 | 6.33 | 7.25 | 7.29 | 7.06 | 6.98 |
| Weight Fraction | 0.391 | 0.483 | 0.469 | 0.391 | 0.388 | 0.408 | 0.414 |
| Edible core moisture content | 59.23 | 59.23 | 59.23 | 59.23 | 59.23 | 59.23 | 59.23 |

Examples 1-7 can be prepared by admixing edible core, agglomerates, filler, and optional ingredients. The edible core can be made first, by preparing a meat slurry by mixing the ingredients and emulsifying, forming the slurry into a shape, and cooking using steam at 100° C. to set the structure of the edible core and followed by cutting the structure into 1.6 cm cubes. In Ex. 4, the edible core can be partially coated with the First Coating by batch tumbling and in Ex. 6-7 the edible core can be wholly coated with the First Coating by batch tumbling. In Ex. 5, edible core can be wholly coated by brushing to create the First Layer on the coated edible core. In Ex. 6 the edible core can be sequentially processed to coat (by batch applying with a tumbler the First Coating and then the First Layer. In Ex. 7, enhancements are made to the coated edible core by preparing the Edible Core, First Coating, and First Layer in the same manner as Ex. 6, followed by adding the Second Coating sequentially, after the First Coating. In Examples 1-7, after the last coating or layer can be added, the structure of the coatings and layers are set by heating in a steam tunnel using 1 atm steam until a center temperature of 67° C. is reached. After the coated edible cores of Ex. 1-7 have been set, the coated edible cores are stirred with the filler and optional ingredients, blended using low shear until the mixture is homogeneous, filled into a package and heat sterilized in a retort.

Coated Pet Food Product Examples:

| | Ex. 8 | Ex. 9 | Ex. 10 | Ex. 11 | Ex. 12 | Ex. 13 | Ex. 14 |
|---|---|---|---|---|---|---|---|
| Edible Core | | Ex. 33 | | | | | |
| Edible core % | | 3.50 | | | | | |
| Edible Core + First Coating + First Layer | | | | | | | |
| Edible core | | | Ex. 27 | | | | |
| Edible core % | | | 10.60 | | | | |
| First Coating | | | Ex. 45 | | | | |
| First Coating % | | | 1.27 | | | | |
| First Layer | | | Ex. 59 | | | | |
| First Layer % | | | 1.90 | | | | |
| Edible Core + First Coating + First Layer + Second Coating | | | | | | | |
| Edible core | Ex. 30 | | | | | Ex. 31 | Ex. 32 |
| Edible core % | 21.33 | | | | | 9.70 | 10.02 |
| First Coating | Ex. 47 | | | | | Ex. 41 | Ex. 41 |
| First Coating % | 2.56 | | | | | 1.16 | 1.20 |
| First Layer | Ex. 61 | | | | | Ex. 55 | Ex. 55 |
| First Layer % | 3.82 | | | | | 1.74 | 1.80 |
| Second Coating | Ex. 42 | | | | | Ex. 41 | Ex. 41 |
| Second Coating % | 0.88 | | | | | 0.40 | 0.42 |
| Edible Core + Optional Ingredients + First Coating + First Layer + Second Coating | | | | | | | |
| Edible core | | | | | | | Ex. 24 |
| Edible core % | | | | | | | 11.27 |
| Optional Ingredients | | | | | | | Ex. 73 |
| Optional Ingredients % | | | | | | | 3.07 |
| First Coating | | | | | | | Ex. 45 |
| First Coating % | | | | | | | 1.35 |
| First Layer | | | | | | | Ex. 59 |
| First Layer % | | | | | | | 2.02 |

-continued

| | Coated Pet Food Product Examples: | | | | | | |
|---|---|---|---|---|---|---|---|
| | Ex. 8 | Ex. 9 | Ex. 10 | Ex. 11 | Ex. 12 | Ex. 13 | Ex. 14 |
| Second Coating | | | | | | | Ex. 45 |
| Second Coating % | | | | | | | 0.47 |
| Optional Ingredients + First Coating + First Layer + Second Coating | | | | | | | |
| Optional Ingredients | | | | | | | Ex. 75 |
| Optional Ingredients % | | | | | | | 1.12 |
| First Coating | | | | | | | Ex. 45 |
| First Coating % | | | | | | | 0.49 |
| First Layer | | | | | | | Ex. 59 |
| First Layer % | | | | | | | 0.74 |
| Second Coating | | | | | | | Ex. 45 |
| Second Coating % | | | | | | | 0.17 |
| Edible Core + First Agglomerate + First Coating + First Layer + Second Coating | | | | | | | |
| Edible core | | | | | | | Ex. 24 |
| Edible core % | | | | | | | 10.62 |
| First Agglomerate | | | | | | | Ex. 38 |
| First Agglomerate % | | | | | | | 6.46 |
| First Coating | | | | | | | Ex. 45 |
| First Coating % | | | | | | | 1.27 |
| First Layer | | | | | | | Ex. 59 |
| First Layer % | | | | | | | 1.90 |
| Second Coating | | | | | | | Ex. 45 |
| Second Coating % | | | | | | | 0.44 |
| Edible Core + First Coating + First Layer + Second Coating + Second Layer + Third Coating | | | | | | | |
| Edible core | | | Ex. 33 | Ex. 29 | | | |
| Edible core % | | | 15.30 | 9.85 | | | |
| First Coating | | | Ex. 45 | Ex. 45 | | | |
| First Coating % | | | 1.83 | 1.18 | | | |
| First Layer | | | Ex. 56 | Ex. 59 | | | |
| First Layer % | | | 2.74 | 1.77 | | | |
| Second Coating | | | Ex. 45 | Ex. 41 | | | |
| Second Coating % | | | 1.75 | 1.13 | | | |
| Second Layer | | | Ex. 56 | Ex. 55 | | | |
| Second Layer % | | | 2.74 | 1.77 | | | |
| Third Coating | | | Ex. 45 | Ex. 41 | | | |
| Third Coating % | | | 0.63 | 0.41 | | | |
| First Coating + First Layer | | | | | | | |
| First Coating | Ex. 47 | Ex. 45 | | | | | |
| First Coating % | 0.42 | 0.42 | | | | | |
| First Layer | Ex. 61 | Ex. 56 | | | | | |
| First Layer % | 0.63 | 0.63 | | | | | |
| First Coating + First Layer + Second Coating | | | | | | | |
| First Coating | | | | | | Ex. 41 | |
| First Coating % | | | | | | 1.69 | |
| First Layer | | | | | | Ex. 55 | |
| First Layer % | | | | | | 2.53 | |
| Second Coating | | | | | | Ex. 41 | |
| Second Coating % | | | | | | 0.84 | |
| First Agglomerate | | Ex. 39 | | | Ex. 37 | | |
| First Agglomerate % | | 3.50 | | | 5.39 | | |
| Second Agglomerate | Ex. 49 | Ex. 50 | Ex. 52 | | Ex. 53 | | |
| Second Agglomerate % | 15.83 | 12.35 | 17.20 | | 5.39 | | |
| Third Agglomerate | | | | Ex. 62 | Ex. 63 | | |
| Third Agglomerate % | | | | 45.49 | 20.53 | | |
| Third Agglomerate + First Coating + First Layer | | | | | | | |
| Third Agglomerate | | | | | | Ex. 64 | |
| Third Agglomerate % | | | | | | 9.99 | |
| First Coating | | | | | | Ex. 41 | |
| First Coating % | | | | | | 6.07 | |

-continued

| Coated Pet Food Product Examples: | | | | | | | |
|---|---|---|---|---|---|---|---|
| | Ex. 8 | Ex. 9 | Ex. 10 | Ex. 11 | Ex. 12 | Ex. 13 | Ex. 14 |
| First Layer | | | | | | Ex. 55 | |
| First Layer % | | | | | | 1.96 | |
| Filler | Ex. 76 | Ex. 83 | Ex. 84 | Ex. 81 | Ex. 79 | Ex. 81 | Ex. 80 |
| Filler % | QS | QS | QS | QS | QS | QS | QS |
| Optional Ingredients | Ex. 72 | Ex. 74 | | Ex. 75 | Ex. 75 | Ex. 70 | |
| Optional Ingredients % | 5.80 | 5.81 | | 5.80 | 5.93 | 6.76 | |
| Weight Fraction | 0.513 | 0.512 | 0.471 | 0.513 | 0.503 | 0.433 | 0.414 |
| Edible core moisture content | 59.23 | 59.23 | 59.23 | 59.23 | 59.23 | 59.23 | 59.23 |
| Edible core density, g/cc | | | | | | | |
| Edible core volume, g/cc | | | | | | | |
| Consistency Value (Pa-sn) of Filler | .0009 | | | | | | |
| Shear Index (1/s) of Filler | 1.0 | | | | | | |

Examples 8-14 are prepared using sequential batch tumbling to coat and layer the edible cores. The coated cores are agglomerated by heat setting the coated and layered edible cores in a steam tunnel to 67° C. center temperature while the coated and/or layered cores are in contact with each other. The agglomerates are mixed with the filler and optional ingredients to prepare a pet food product, packed and rendered shelf stable by retort.

| | Coated Pet Food Product Examples: | | | | | | |
|---|---|---|---|---|---|---|---|
| | Ex. 15 | Ex. 16 | Ex. 17 | Ex. 18 | Ex. 19 | Ex. 20 | Ex. 21 |
| Edible Core | | | | | | Ex. 24 | |
| Edible Core % | | | | | | 11.59 | |
| Edible Core + First Coating | | | | | | | |
| Edible core | | | | | | Ex. 24 | |
| Edible Core % | | | | | | 2.33 | |
| First Coating | | | | | | Ex. 45 | |
| First Coating % | | | | | | 0.31 | |
| Edible Core + First Layer | | | | | | | |
| Edible Core | | | | | | Ex. 24 | |
| Edible Core % | | | | | | 2.43 | |
| First Layer | | | | | | Ex. 59 | |
| First Layer % | | | | | | 0.20 | |
| Edible Core + First Coating + First Layer | | | | | | | |
| Edible Core | | | | | | Ex. 24 | |
| Edible Core % | | | | | | 2.01 | |
| First Coating | | | | | | Ex. 45 | |
| First Coating % | | | | | | 0.26 | |
| First Layer | | | | | | Ex. 59 | |
| First Layer % | | | | | | 0.36 | |
| Edible Core + First Coating + First Layer + Second Coating | | | | | | | |
| Edible core | Ex. 22 | Ex. 22 | Ex. 22 | Ex. 22 | Ex. 24 | Ex. 24 | Ex. 28 |
| Edible core % | 10.80 | 21.62 | .0073 | 10.80 | 10.80 | 8.52 | 73.56 |
| First Coating | Ex. 41 | Ex. 41 | Ex. 41 | Ex. 41 | Ex. 45 | Ex. 45 | Ex. 41 |
| First Coating % | 1.41 | 2.83 | .0010 | 1.41 | 1.41 | 1.12 | 9.65 |
| First Layer | Ex. 55 | Ex. 55 | Ex. 55 | Ex. 55 | Ex. 59 | Ex. 59 | Ex. 55 |
| First Layer % | 1.94 | 3.87 | .0013 | 1.94 | 1.94 | 1.53 | 13.18 |
| Second Coating | Ex. 41 | Ex. 41 | Ex. 41 | Ex. 41 | Ex. 45 | Ex. 45 | Ex. 41 |
| Second Coating % | 0.53 | 1.06 | .0003 | 0.53 | 0.53 | 0.42 | QS |
| Coating and Layer components without Edible Core | | | | | | | |
| First Coating + First Layer | | | | | | | |
| First Coating | | | | Ex. 41 | | Ex. 45 | |
| First Coating % | | | | .0042 | | 0.67 | |
| First Layer | | | | Ex. 55 | | Ex. 59 | |
| First Layer % | | | | .0058 | | 0.91 | |
| First Coating + First Layer + Second Coating | | | | | | | |
| First Coating | Ex. 41 | Ex. 41 | | | Ex. 41 | Ex. 45 | Ex. 45 |
| First Coating % | 0.75 | 1.50 | | | 0.75 | 0.75 | 0.59 |

| Coated Pet Food Product Examples: | | | | | | | |
|---|---|---|---|---|---|---|---|
| | Ex. 15 | Ex. 16 | Ex. 17 | Ex. 18 | Ex. 19 | Ex. 20 | Ex. 21 |
| First Layer | Ex. 55 | Ex. 55 | | Ex. 55 | Ex. 59 | Ex. 59 | |
| First Layer % | 1.02 | 2.04 | | 1.02 | 1.02 | 0.81 | |
| Second Coating | Ex. 41 | Ex. 41 | | Ex. 41 | Ex. 45 | Ex. 45 | |
| Second Coating % | 0.24 | 0.47 | | 0.24 | 0.24 | 0.19 | |
| First Agglomerate | Ex. 37 | Ex. 37 | | Ex. 38 | Ex. 37 | Ex. 38 | |
| First Agglomerate % | 5.04 | 10.09 | | 5.04 | 5.04 | 3.98 | |
| Second Agglomerate | Ex. 48 | Ex. 48 | Ex. 48 | Ex. 51 | Ex. 48 | Ex. 51 | |
| Second Agglomerate % | 5.04 | 10.09 | .0100 | 5.04 | 5.04 | 3.98 | |
| Third Agglomerate | Ex. 65 | Ex. 65 | | Ex. 67 | Ex. 68 | Ex. 66 | |
| Third Agglomerate % | 19.19 | 38.41 | | 19.19 | 19.19 | 15.14 | |
| (A) Filler | Ex. 81 | Ex. 78 | Ex. 81 | Ex. 80 | Ex. 81 | Ex. 80 | |
| (B) Filler | | | | Ex. 81 | Ex. 80 | | |
| (A) Filler % | QS | QS | QS | 25.03 | 25.03 | QS | |
| (B) Filler % | | | | QS | QS | | |
| Optional Ingredients | Ex. 73 | Ex. 73 | | Ex. 72 | Ex. 72 | Ex. 72 | |
| Optional Ingredients % | 4.00 | 8.02 | | 4.00 | 4.00 | 3.16 | |
| Solids Fraction | .635 | | | | | .690 | |
| Weight Fraction | .500 | 1.000 | .0003 | .500 | .500 | .605 | 1.000 |
| Edible core moisture content | 59.23 | 59.23 | 59.23 | 59.23 | 59.23 | 59.23 | |
| Edible core density, g/cc | 1.08 | | | | | 1.06 | |
| Edible core volume, cc | 2.94 | | | | | 3.09 | |
| Consistency Value (Pa-sn) of Filler | 8.7 | | | | | 2.8 | |
| Shear Index (1/s) of Filler | 2.8 | | | | | 0.58 | |

Examples 15-20 are prepared using sequential continuous enrobing to coat and layer the edible cores. The coated cores are agglomerated by heat setting the coated and layered edible cores in a steam tunnel to 67° C. center temperature while the coated and/or layered cores are in contact with each other. The agglomerates are mixed with the filler and optional ingredients to prepare a coated pet food product, packed and rendered shelf stable by retort. Examples 15-20, excess of coating and layer materials which has not attached itself to an edible core is processed with the coated and layered edible core, and is mixed into the coated pet food.

| | Edible Core Examples: | | | | | | | |
|---|---|---|---|---|---|---|---|---|
| (Type) Ingredient | Ex. 22 | Ex. 23 | Ex. 24 | Ex. 25 | Ex. 26 | Ex. 27 | Ex. 28 | Ex. 29 |
| (Z) Water | 6.28 | 3.32 | 14.65 | 6.25 | 6.28 | | | |
| (Y) Chicken, comminuted | 53.95 | 28.53 | 66.93 | 53.68 | 53.9 | | | |
| (Z) Wet Textured Wheat Protein (Water, Wheat Gluten, Wheat Flour, Caramel, Phosphate, Antioxidants) | | 32.57 | | | | | | |
| (Y) Beef | 23.49 | 12.42 | | | | | | |
| (Y) Salmon | | | | 23.38 | | | | |
| (Y) Kangaroo | | | | | 23.5 | | | |
| (Z) Carrots, 6.4 mm cube | | 6.86 | | | | | | |
| (Z) Peas | | 4.52 | | | | | | |
| (Z) Dehydrated Potato 9.5 mm cube | | 3.18 | | | | | | |
| (X) Animal Plasma APC, Inc. Ames, IA | 4.28 | 2.26 | 4.68 | 4.26 | 4.27 | | | |
| (X) Beet Pulp | 3.523 | 1.863 | 3.648 | 3.506 | 3.52 | | | |
| (X) Calcium Carbonate | 1.60 | 0.846 | 1.67 | 1.59 | 1.60 | | | |
| (X) Sodium Tripolyphosphate Astaris, St. Louis, Mo | 1.25 | 0.66 | 1.37 | 1.24 | 1.25 | | | |
| (X) L-Lysine | 0.811 | 0.429 | 1.040 | 0.807 | 0.81 | | | |
| (X) Potassium Chloride | 0.806 | 0.426 | 0.881 | 0.802 | 0.81 | | | |
| (X) Choline Chloride | 0.528 | 0.279 | 0.516 | 0.525 | 0.53 | | | |
| (X) Vitamins | 0.487 | 0.257 | 0.504 | 0.485 | 0.49 | | | |
| (X) Onion Powder | 0.374 | 0.198 | 0.394 | 0.373 | 0.37 | | | |
| (X) Trace Minerals | 0.371 | 0.196 | 0.375 | 0.370 | 0.37 | | | |
| (X) Salt | 0.362 | 0.191 | 0.375 | 0.360 | 0.36 | | | |
| (Y) Fish Oil | 1.005 | 0.532 | 1.256 | 1.000 | 1.01 | | | |
| (X) DL-Methionine | 0.096 | 0.051 | 0.162 | 0.096 | 0.10 | | | |
| (X) Garlic Powder | 0.125 | 0.066 | 0.197 | 0.125 | 0.13 | | | |

-continued

| (Type) Ingredient | Edible Core Examples: | | | | | | | |
|---|---|---|---|---|---|---|---|---|
| | Ex. 22 | Ex. 23 | Ex. 24 | Ex. 25 | Ex. 26 | Ex. 27 | Ex. 28 | Ex. 29 |
| (Y) Mixed Tocopherols | 0.071 | 0.037 | 0.070 | 0.070 | 0.07 | | | |
| (X) Iron Chelate 20% Albion, UT | 0.061 | 0.032 | 0.069 | 0.060 | 0.06 | | | |
| (X) Citric Acid | QS | QS | QS | QS | QS | | | |
| (X) Celery Powder | | | 0.134 | | | | | |
| Dried Cod | | | | | | 100 | | |
| Beef Jerky | | | | | | | 100 | |
| Broiled Duck Breast | | | | | | | | 100 |
| Colorant | | | | | | | | |
| (X) FD&C Yellow 5 | | | | 0.83 | | | | |
| (X) FD&C Red 40 | | | | 0.17 | 0.08 | | | |
| (X) Titanium dioxide powder | | | 1.05 | | | | | |
| (X) Malt | 0.50 | 0.27 | | | 0.50 | | | |
| Edible core moisture content | | | | | | | | 23.4 |

Examples 22-26 and 30-33

Examples 22-26 and 30-33 can be made in the following manner. All ingredients of Type (X) can be prepared as a dry batch by conventional dry blending. Animal protein (salmon, kangaroo, beef, chicken) ingredients of Type (Y) can be frozen until use and ground using a conventional meat grinder through a 9.5 millimeter diameter hole grinding plate. All ingredients of Type (Y) can be prepared as a wet batch by conventional mixing, the temperature not exceeding 0° C. during mixing. Mix Type (X) dry batch and all Type (Z) ingredients into Type (Y) wet batch using conventional mixing techniques; the temperature not exceeding 0° C. during mixing. Hereafter the Meat Slurry is the X+Y+Z mixture.

The Meat Slurry can be shaped to form ropes measuring 15.8 mm×15.8 mm×1000 mm using an extruder with an extrusion die plate and an orifice measuring 15.8 mm×15.8 mm. Extrusion equipment (Selo Food Technology B.V., Holland, or equivalent) can be integrated for continuous and sequential use with a belt equipped steam tunnel (Selo Food Technology B.V., Holland, or equivalent). The edible core can be prepared by heating until a center temperature of 67° C. is reached as measured using a handheld temperature probe (e.g. VWR Corning® model 310). Heating is under saturated steam at atmospheric pressure (100° C.) and reducing the largest dimension to the final size using a continuous dicer (Carruthers Equipment Co, Warrenton, Oreg., or equivalent). Edible core is cooled to 4° C. on covered stainless steel cooling trays.

Examples 22, 23, 24, 25, and 26 can use various animal and plant protein sources to comprise edible core. Further Example 23 can use of vegetables in the edible core.

Examples 27, 28, and 29 can use various ingredients that can comprise, but not limited to, the edible core. The method and preparation of these ingredients are common to the industry that supplies these ingredients.

Examples 30-33 can use hydrocolloid and/or gum systems to manage moisture content in edible core; these systems or combinations thereof are non-limiting.

| | Edible Core Examples: | | | | | | |
|---|---|---|---|---|---|---|---|
| | Ex. 30 | Ex. 31 | Ex. 32 | Ex. 33 | Ex. 34 | Ex. 35 | Ex. 36 |
| (Z) Water | 7.49 | 17.57 | 25.72 | 37.95 | | | |
| (X) Spray Dried Beef Broth | 0.51 | 0.45 | 0.41 | 0.34 | | | |
| (Y) CHICKEN, Comminuted | 62.86 | 56.01 | 50.47 | 42.16 | | | |
| (Y) Beef | 16.25 | 14.48 | 13.04 | 10.90 | | | |
| (X) Gaur Gum Ph-8/24 Tic Gums, Belcamp, MD | 0.42 | 0.38 | 0.34 | 0.28 | | | |
| (X) TICAXAN Xanthan Powder TIC Gums, Belcamp, MD | 0.039 | 0.035 | 0.031 | 0.026 | | | |
| (X) Animal Plasma APC, Inc. Ames, IA | 3.25 | 2.90 | 2.61 | 2.18 | | | |
| (X) Beet Pulp | 2.437 | 2.172 | 1.957 | 1.635 | | | |
| (X) Calcium Carbonate | 0.886 | 0.790 | 0.712 | 0.594 | | | |
| (X) Sodium Tripolyphosphate Astaris, St. Louis, MO | 1.66 | 1.48 | 1.33 | 1.11 | | | |
| (X) L-Lysine | 0.145 | 0.129 | 0.116 | 0.097 | | | |
| (X) Potassium Chloride | 0.552 | 0.492 | 0.443 | 0.370 | | | |
| (X) Vitamins | 0.479 | 0.427 | 0.384 | 0.321 | | | |
| (X) Onion Powder | 0.284 | 0.253 | 0.228 | 0.191 | | | |
| (X) Trace Minerals | 0.296 | 0.264 | 0.237 | 0.198 | | | |
| (X) Salt | 0.474 | 0.422 | 0.381 | 0.318 | | | |
| (Y) Fish Oil | 0.374 | 0.334 | 0.301 | 0.251 | | | |
| (X) DL-Methionine | 0.129 | 0.115 | 0.104 | 0.086 | | | |

-continued

|  | Edible Core Examples: | | | | | | |
|---|---|---|---|---|---|---|---|
|  | Ex. 30 | Ex. 31 | Ex. 32 | Ex. 33 | Ex. 34 | Ex. 35 | Ex. 36 |
| (X) Garlic Powder | 0.095 | 0.084 | 0.076 | 0.064 | | | |
| (Y) Mixed Tocopherols | 0.047 | 0.042 | 0.038 | 0.032 | | | |
| (X) Citric Acid | QS | QS | QS | QS | | | |
| (X) Dried Egg Product Colorant | 0.650 | 0.579 | 0.522 | 0.436 | | | |
| (X) Caramel | 0.005 | 0.004 | 0.004 | 0.003 | | | |
| (X) Malt | 0.65 | 0.58 | 0.53 | 0.44 | | | |
| Diced mackerel | | | | | 100 | | |
| Diced beef (B) | | | | | | 50.0 | |
| Diced chicken (C) | | | | | | QS | 100 |
| Total | 105.6 | 118.4 | 131.4 | 157.3 | 58.72 | 117.4 | 58.72 |
| Edible core moisture content | 61.8 | 65.9 | 69.3 | 74.3 | | 53.50 (B); 72.54 (C) | 72.54 |

Examples 27-29, 34-36

Examples 27, 28, 29, 34, 35, and 36 can use a commodity source of animal protein as edible cores. Mackeral, beef, or chicken are diced using commercial slicing/dicing equipment to 1.6 cm cubes.

|  | First Agglomerate Examples: | | | |
|---|---|---|---|---|
|  | Ex. 37 | Ex. 38 | Ex. 39 | Ex. 40 |
| Textured wheat protein Wheatex ® 1504DC (dark caramel color) MGP Ingredients, Atchison, KS | 32.35 | | | |
| Textured wheat protein Wheatex ® 1502C (light caramel color) MGP Ingredients, Atchison, KS | | | | 32.35 |
| Textured wheat protein Wheatex ® 1501 (light tan color) MGP Ingredients, Atchison, KS | | 32.35 | | |
| Textured wheat protein Wheatex ® 1505W (bright white color) MGP Ingredients, Atchison, KS | | | 32.35 | |
| Water (preferred 65° C.) | QS | QS | QS | QS |

|  | Coating Examples: | | | | | | |
|---|---|---|---|---|---|---|---|
|  | Ex. 41 | Ex. 42 | Ex. 43 | Ex. 44 | Ex. 45 | Ex. 46 | Ex. 47 |
| Water | QS | QS | QS | QS | QS | QS | QS |
| Egg White Solids (powder) Ballas Egg Products Corp., Zanesville, OH | 17.85 | | | | 16.01 | | |
| Mixed Berry Rice Protein (powder) (enzymatically processed rice protein from brown rice, natural flavor, guar gum, xanthan gum) NutriBiotic, Lakeport, CA | | 13.33 | | | | | |
| Whey Protein (micro-filtered and ion-exchanged whey protein isolates, hydrolyzed whey protein concentrate, natural vanilla flavor, free form amino acids (L-glutamine, L-leucine, L-isoleucine, L-valine), stevia) Show Me The Whey ®, Dorothy Lane Market, Dayton, OH | | | 18.18 | | | | |

| | | | | | | |
|---|---|---|---|---|---|---|
| ENER-G ® Egg Replacer (potato starch, tapioca flour, leavening (calcium lactate, calcium carbonate, citric acid), cellulose gum, carbohydrate gum) ENER-G Foods, Inc. Seattle, WA | | 18.18 | | | | |
| Stone Ground Corn flour + White sorghum flour 50:50 mixture (whole grain organic corn, whole grain sweet white sorghum) Bob's Red Mill Natural Foods, Milwaukie, OR | | 2.00 | | | | |
| Soy protein isolate powder. Bob's Red Mill, Milwaukie, OR. | | | 18.00 | | | |
| Soy flour (stone ground whole grain soy flour) Bob's Red Mill Natural Foods, Milwaukie, OR. | | | | 18.00 | | |
| Salt | | | 0.99 | 0.99 | 0.99 | |
| Colorant: Malt | 1.79 | | | | | |

Second Agglomerate Examples:

| | Ex. 48 | Ex. 49 | Ex. 50 | Ex. 51 | Ex. 52 | Ex. 53 | Ex. 54 |
|---|---|---|---|---|---|---|---|
| Hydrated and Shredded Textured wheat protein Wheatex ® 1504DC (dark caramel color) | 82.26 | | | | | | |
| Hydrated and Shredded Textured wheat protein Wheatex ® 1502C (light caramel color) | | | | 82.26 | | | |
| Shredded Textured wheat protein Wheatex ® Redishred 65W (light tan color) MGP Ingredients, Atchison, KS | | 82.26 | | | | | |
| Hydrated and Shredded Textured wheat protein Wheatex ® 1505W (bright white color) | | | 82.26 | | | | |
| Hyrdrated and Shredded Textured wheat protein TWP#139W | | | | | 82.26 | | |
| Hydrated and Shredded Textured soy protein (water, defatted soy flour, FD&C Yellow 5, FD&C Red 40) | | | | | | 82.26 | |
| Hydrated and Shredded Textured soy protein (water, soy concentrate, FD&C Yellow 5, FD&C Red 40) | | | | | | | 82.26 |
| Water | QS | QS | QS | QS | QS | QS | QS |
| Egg White Solids (powder) Ballas Egg Products Corp, Zanesville, OH | 3.22 | 3.22 | 3.22 | 3.22 | 3.22 | 3.22 | 3.22 |
| Colorant: Caramel | 0.32 | | | | | | |

Layer Examples:

| | Ex. 55 | Ex. 56 | Ex. 57 | Ex. 58 | Ex. 59 | Ex. 60 | Ex. 61 |
|---|---|---|---|---|---|---|---|
| Ground Wheatex ® 1504DC (dark caramel color) | 100 | | | | | 75 | |
| Ground Textured wheat protein Wheatex ® 1502C (light caramel color) | | | | | | 20 | |
| Shredded Textured wheat protein Wheatex ® Redishred 65W (light tan color) MGP Ingredients, Atchison, KS | | | | 70 | 100 | | |

-continued

| | | | | | | |
|---|---|---|---|---|---|---|
| Ground Textured wheat protein Wheatex ® 1505W (bright white color) | 99 | 5 | | | | |
| Ground Textured wheat protein TWP#139W | | | | | 90 | |
| Ground Textured soy protein (defatted soy flour, FD&C Yellow 5, FD&C Red 40) | | | 5 | | | |
| Ground Textured soy protein (soy concentrate, FD&C Yellow 5, FD&C Red 40) | | 75 | | | | |
| Wheat flour | | 10 | 20 | | | |
| Corn Starch | | 6 | QS | | | |
| Optional Additional Ingredients | | 3 | | | QS | |
| Colorant | | | | | | |
| Caramel | | | | | QS | |
| FD&C Yellow 6 | QS | | | | | |
| Titanium dioxide powder | 0.75 | QS | | | | |
| Malted barley flour | | | | | 6 | |

|  | Third Agglomerate Examples: | | | | | | |
|---|---|---|---|---|---|---|---|
|  | Ex. 62 | Ex. 63 | Ex. 64 | Ex. 65 | Ex. 66 | Ex. 67 | Ex. 68 |
| Hydrated and Shredded Textured wheat protein Wheatex ® 1504DC (dark caramel color) | 15.09 | | | 62.59 | | 31.30 | 31.30 |
| Hydrated and Shredded Textured wheat protein Wheatex ® 1502C (light caramel color) | 7.54 | | | | | | |
| Shredded Textured wheat protein Wheatex ® Redishred 65W (light tan color) MGP Ingredients, Atchison, KS | 7.54 | | | | 62.59 | 31.30 | 31.30 |
| Hydrated and Shredded Textured wheat protein Wheatex ® 1505W (bright white color) | | 6.00 | | | | | |
| Hyrdrated and Shredded Textured wheat protein TWP#139W | | 9.99 | | | | | |
| Hydrated and Shredded Textured soy protein (water, defatted soy flour, FD&C Yellow 5, FD&C Red 40) | | | 14.81 | | | | |
| Hydrated and Shredded Textured soy protein (water, soy concentrate, FD&C Yellow 5, FD&C Red 40) | | | 14.81 | | | | |
| Water | 12.39 | 6.57 | 12.16 | 10.82 | 10.82 | 10.82 | 10.82 |
| Egg White Solids (powder) Ballas Egg Products Corp., Zanesville, OH | 2.75 | 1.46 | 2.70 | 2.40 | 2.40 | 2.40 | 2.40 |
| Edible core from Ex. 33 | 54.68 | | | | | | |
| Edible core + First Coating + First Layer + Second Coating | | 31.98 | | | | | |
| Edible core | | Ex. 31 | | Ex. 22 | Ex. 24 | Ex. 24 | Ex. 22 |
| Edible core % | | 32.38 | | 17.79 | 17.79 | 17.79 | 17.79 |
| First Coating | | Ex. 41 | | Ex. 41 | Ex. 45 | Ex. 45 | Ex. 41 |
| First Coating % | | 4.23 | | 2.32 | 2.32 | 2.32 | 2.32 |
| First Layer | | Ex. 55 | | Ex. 55 | Ex. 59 | Ex. 59 | Ex. 55 |
| First Layer % | | 5.82 | | 3.20 | 3.20 | 3.20 | 3.20 |
| Second Coating | | Ex. 41 | | Ex. 41 | Ex. 45 | Ex. 45 | Ex. 41 |
| Second Coating % | | 1.59 | | 0.87 | 0.87 | 0.87 | 0.87 |
| Second Agglomerate from Ex. 54 | | | 27.76 | | | | |
| Second Agglomerate from Ex. 54 | | | 27.76 | | | | |

|  | Optional Ingredients Examples: | | | | | | |
|---|---|---|---|---|---|---|---|
|  | Ex. 69 | Ex. 70 | Ex. 71 | Ex. 72 | Ex. 73 | Ex. 74 | Ex. 75 |
| Diced Carrots |  | 47 |  | QS |  |  | 33 |
| Frozen Peas |  | 31.3 |  |  |  |  |  |
| Dehydrated Diced Potatoes |  | QS |  |  |  | 50 |  |
| Diced Potatoes |  |  | 33 |  |  |  |  |
| Dehydrated Vegetable | 25 |  |  |  |  |  |  |
| Fresh Vegetable | 25 |  |  |  |  |  |  |
| Frozen Vegetable | QS |  |  |  |  |  |  |
| Wild rice |  |  |  | 12.5 |  |  | 33 |
| Minced Corn |  |  | 33 |  |  |  |  |
| Cut Green Beans |  |  | QS | 33.5 |  |  |  |
| Minced Strawberries |  |  |  |  | 25 |  |  |
| Minced Cranberries |  |  |  |  | 25 | QS |  |
| Minced Cherries |  |  |  |  | QS |  |  |
| Diced Tomato | 25 |  |  |  |  |  |  |
| Diced Apple |  |  |  |  | 25 |  | QS |

|  | Filler Examples: | | | | | | | | | |
|---|---|---|---|---|---|---|---|---|---|---|
|  | Ex. 76 | Ex. 77 | Ex. 78 | Ex. 79 | Ex. 80 | Ex. 81 | Ex. 82 | Ex. 83 | Ex. 84 | Ex. 85 |
| Gravy Mix with Beef flavor (A) |  |  |  |  |  | 8 | 7 |  |  |  |
| Gravy Mix with Chicken flavor |  |  |  | 8 |  |  |  |  |  |  |
| Water | 100 | QS |  | QS | QS | QS | QS | QS |  | QS |
| Nitrogen |  |  | 99 |  |  |  |  |  |  |  |
| Air |  |  | QS |  |  |  |  |  |  |  |
| Spray Dried Fish Broth |  |  |  |  |  |  |  | 2.3 |  |  |
| Dehydrated Tomato Juice |  |  |  |  | 4 |  |  |  |  |  |
| Apple Puree |  |  |  |  |  |  | 5 |  |  |  |
| Gelatin Solids |  |  |  | 14 |  |  |  |  |  |  |
| Beet Juice |  |  |  | 3 |  |  |  |  |  |  |
| Whole Egg Solids |  | 23 |  |  |  |  |  |  |  |  |
| Chicken, comminuted |  |  |  |  |  |  |  |  | 80 |  |
| Colorant: Titanium dioxide |  |  |  |  |  |  |  |  | 0.75 |  |
| Colorant: FD&C Red#40 |  |  |  |  |  |  |  |  | 0.4 |  |
| *Iams Savory Sauce ® |  |  |  |  |  |  |  |  |  | 100 |

*ingredients: Country Style Chicken (Chicken Broth, Chicken, Chicken Fat (preserved with Mixed Tocopherols, a source of Vitamin E, and Citric Acid), Sodium Bisulfate, Xanthan Gum, Chicken Flavors, Dried Beet Pulp (sugar removed), Potassium Sorbate (a preservative), Brewers Dried Yeast, Flax Meal, Carrots, Peas, Vitamins (Vitamin E Supplement, Ascorbic Acid, Vitamin A Acetate, Calcium Pantothenate, Biotin, Thiamine Mononitrate (source of vitamin B1), Vitamin B12 Supplement, Niacin, Riboflavin Supplement (source of vitamin B2), Inositol, Pyridoxine Hydrochloride (source of vitamin B6), Vitamin D3 Supplement, Folic Acid), Potassium Chloride, Minerals (Ferrous Sulfate, Zinc Oxide, Manganese Sulfate, Copper Sulfate, Manganous Oxide, Potassium Iodide, Cobalt Carbonate), Rosemary Extract) Procter & Gamble, Cincinnati, OH Examples 81 and 82 can comprise the Gravy Mix with Beef Flavor (A)(Kerry Ingredients, Beloit, Wis.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A coated pet food product comprising:
   an edible core having a moisture content of at least about 50%;
   a first coating comprising a binder comprising egg whites, wherein said first coating is coated onto the edible core, and wherein said coating comprises from about 1% to about 50%, by weight of the coating of said binder;
   a first layer comprising a plurality of particles adhered together to form the first layer;
   wherein the first layer is bonded with the edible core using the first coating and resists 98% of abrasion in an abrasion test; and
   wherein the edible core has a volume of from about 0.256 cubic centimeters to about 16.4 cubic centimeters.

2. The coated pet food product of claim 1, further comprising a filler having a Consistency Value (K) of from about 0.02 to about 1000 Pa-s".

3. The coated pet food product of claim 1, wherein said core is wholly covered by said first coating, said first layer or combinations thereof.

4. The coated pet food product of claim 1, wherein said edible core has a Moisture Content of at least about 60%.

5. The coated pet food product of claim 1, further comprising a filler selected from the group consisting of gravy, gel, jelly, aspic, sauce, water, air, broth, and combinations thereof.

6. The coated pet food product of claim 1, wherein said edible core comprises a structurant.

7. The coated pet food product of claim 1, further comprising at least one vegetable, at least one fruit, a colorant, flavorants, seasonings, salts, minerals, vitamins, antioxidants, prebiotics, probiotics, aroma modifiers, water or combinations thereof.

8. The coated pet food product of claim 1, wherein the product has a Solid Fraction of from about 0.0003 to about 0.98.

9. The coated pet food product of claim 1, wherein the product has a Solid Fraction of from about 0.003 to about 0.88.

10. The coated pet food product of claim 1, wherein the product has a Solid Fraction of from about 0.03 to about 0.75.

11. The coated pet food product of claim 7, wherein said colorant is selected from synthetic or natural colorants, and any combination thereof.

12. The coated pet food product of claim 1, wherein the product has a Weight Fraction of from about 0.00003 to about 1.

13. The coated pet food product of claim 2, wherein said filler has a Consistency Value (K) of from about 0.01 to about 600 Pa-s$''$.

14. The coated pet food product of claim 2, wherein said filler has a Consistency Value (K) of from about 0.1 to about 400 Pa-s$''$.

15. The coated pet food product of claim 2, wherein said filler has a Consistency Value (K) of from about 0.2 to about 100 Pa-s$''$.

16. The coated pet food product of claim 1, wherein the edible core has a density of from about 0.1 g/cc to about 3 g/cc.

17. The coated pet food product of claim 1, wherein the first layer comprises a material selected from the group consisting of plant protein, farinaceous matter, vegetables, fruit, and combinations thereof.

* * * * *